(12) United States Patent
Liu et al.

(10) Patent No.: US 11,967,175 B2
(45) Date of Patent: Apr. 23, 2024

(54) FACIAL EXPRESSION RECOGNITION METHOD AND SYSTEM COMBINED WITH ATTENTION MECHANISM

(71) Applicant: CENTRAL CHINA NORMAL UNIVERSITY, Hubei (CN)

(72) Inventors: Sannyuya Liu, Hubei (CN); Zongkai Yang, Hubei (CN); Xiaoliang Zhu, Hubei (CN); Zhicheng Dai, Hubei (CN); Liang Zhao, Hubei (CN)

(73) Assignee: CENTRAL CHINA NORMAL UNIVERSITY, Hubei (CN)

( * ) Notice: Subject to any disclaimer, the term of this patent is extended or adjusted under 35 U.S.C. 154(b) by 0 days.

(21) Appl. No.: 18/322,517

(22) Filed: May 23, 2023

(65) Prior Publication Data

US 2023/0298382 A1 Sep. 21, 2023

Related U.S. Application Data

(63) Continuation-in-part of application No. PCT/CN2021/128102, filed on Nov. 2, 2021.

(30) Foreign Application Priority Data

Nov. 24, 2020 (CN) .......................... 202011325980.4

(51) Int. Cl.
*G06K 9/00* (2022.01)
*G06V 10/24* (2022.01)
(Continued)

(52) U.S. Cl.
CPC .......... *G06V 40/165* (2022.01); *G06V 10/247* (2022.01); *G06V 10/62* (2022.01);
(Continued)

(58) Field of Classification Search
None
See application file for complete search history.

(56) References Cited

U.S. PATENT DOCUMENTS 10,366,292 B2 * 7/2019 Min .................. H04N 5/278
10,402,658 B2 * 9/2019 Min .................. G06V 20/52
(Continued)

FOREIGN PATENT DOCUMENTS

| CN | 110427867 | 11/2019 |
|---|---|---|
| CN | 111797683 | 10/2020 |

(Continued)

OTHER PUBLICATIONS

Liang et al., "Fine-Grained Facial Expression Recognition in the Wild," in IEEE Transactions on Information Forensics and Security, vol. 16, pp. 482-494, 2021, doi: 10.1109/TIFS.2020.3007327. (Date of Publication: Jul. 6, 2020) (Year: 2020).*

(Continued)

*Primary Examiner* — Feng Niu
(74) *Attorney, Agent, or Firm* — JCIPRNET

(57) ABSTRACT

Provided are a facial expression recognition method and system combined with an attention mechanism. The method comprises: detecting faces comprised in each video frame in a video sequence, and extracting corresponding facial ROIs, so as to obtain facial pictures in each video frame; aligning the facial pictures in each video frame on the basis of location information of facial feature points of the facial pictures; inputting the aligned facial pictures into a residual neural network, and extracting spatial features of facial expressions corresponding to the facial pictures; inputting the spatial features of the facial expressions into a hybrid attention module to acquire fused features of the facial expressions; inputting the fused features of the facial expressions into a gated recurrent unit, and extracting temporal features of the facial expressions; and inputting the temporal (Continued)

features of the facial expressions into a fully connected layer, and classifying and recognizing the facial expressions.

6 Claims, 6 Drawing Sheets

(51) Int. Cl.
| | |
|---|---|
| *G06V 10/62* | (2022.01) |
| *G06V 10/77* | (2022.01) |
| *G06V 10/80* | (2022.01) |
| *G06V 10/82* | (2022.01) |
| *G06V 20/40* | (2022.01) |
| *G06V 40/16* | (2022.01) |
| *G06V 10/774* | (2022.01) |

(52) U.S. Cl.
CPC ........ *G06V 10/7715* (2022.01); *G06V 10/806* (2022.01); *G06V 10/82* (2022.01); *G06V 20/41* (2022.01); *G06V 40/171* (2022.01); *G06V 40/174* (2022.01); *G06V 10/774* (2022.01)

(56) References Cited

U.S. PATENT DOCUMENTS

| | | | |
|---|---|---|---|
| 10,747,989 B2* | 8/2020 | Zou | G06V 10/82 |
| 2018/0121731 A1* | 5/2018 | Min | G06V 10/94 |
| 2018/0121734 A1* | 5/2018 | Min | G06V 20/47 |
| 2018/0124331 A1* | 5/2018 | Min | G06V 20/48 |
| 2020/0065563 A1 | 2/2020 | Zou et al. | |
| 2021/0134062 A1* | 5/2021 | Joseph | H04N 7/157 |

FOREIGN PATENT DOCUMENTS

| | | |
|---|---|---|
| CN | 111967436 | 11/2020 |
| CN | 112418095 | 2/2021 |

OTHER PUBLICATIONS

Mai et al., "Locally Confined Modality Fusion Network With a Global Perspective for Multimodal Human Affective Computing," in IEEE Transactions on Multimedia, vol. 22, No. 1, pp. 122-137, Jan. 2020, doi: 10.1109/TMM.2019.2925966. (Date of Publication: Jul. 1, 2019) (Year: 2019).*
Cui et al., "Deep Gesture Video Generation With Learning on Regions of Interest," in IEEE Transactions on Multimedia, vol. 22, No. 10, pp. 2551-2563, Oct. 2020, doi: 10.1109/TMM.2019.2960700. (Date of Publication: Dec. 18, 2019) (Year: 2019).*
Sang et al., "Two-Level Attention Model Based Video Action Recognition Network," in IEEE Access, vol. 7, pp. 118388-118401, 2019, doi: 10.1109/ACCESS.2019.2936628. (Year: 2019).*
Liu et al., "Facial Expression Recognition for In-the-wild Videos," 2020 15th IEEE International Conference on Automatic Face and Gesture Recognition (FG 2020), Buenos Aires, Argentina, 2020, pp. 615-618, doi: 10.1109/FG47880.2020.00102. (Nov. 16-20, 2020) (Year: 2020).*
Oh et al., "A survey of automatic facial micro-expression analysis: databases, methods, and challenges." Front Psychol. Jul. 10, 2018;9:1128. doi: 10.3389/fpsyg.2018.01128. PMID: 30042706; PMCID: PMC6049018. (Year: 2018).*
"International Search Report (Form PCT/ISA/210) of PCT/CN2021/128102," with English translation thereof, dated Feb. 10, 2022, pp. 1-6.
"Written Opinion of the International Searching Authority (Form PCT/ISA/237) of PCT/CN2021/128102," dated Feb. 10, 2022, pp. 1-5.

* cited by examiner

FACIAL EXPRESSION RECOGNITION METHOD AND SYSTEM COMBINED WITH ATTENTION MECHANISM

CROSS-REFERENCE TO RELATED APPLICATION

This is a continuation-in-part application of International Application No. PCT/CN2021/128102, filed on Nov. 2, 2021, which claims the priority benefits of China Application No. 202011325980.4, filed on Nov. 24, 2020. The entirety of each of the above-mentioned patent applications is hereby incorporated by reference herein and made a part of this specification.

BACKGROUND

Technical Field

The disclosure belongs to the technical field of expression recognition, and more specifically, relates to a facial expression recognition method and system combined with an attention mechanism.

Description of Related Art

Facial expression is the physiological and psychological response of humans to convey emotional states. Facial expression recognition is commonly applied in various fields such as robotics, intelligent medical care, human-computer interaction, and online education. The current facial expression recognition technology is mainly categorized into static image recognition and dynamic video sequence recognition. Image recognition only takes current image features into consideration, but facial expression is a dynamic process, and static image recognition ignores the changes of expression on time and space dimensions, which is a limitation of static image recognition. Therefore, further research on facial expression recognition needs to consider the spatial-temporal features of expressions, and recognize facial expressions on video sequences to improve the performance of the algorithm.

Current recognition technologies commonly used for facial expression recognition on video sequence include CNN+RNN cascade network, three-dimensional convolutional neural network 3DCNN, optical flow method, etc. The CNN+RNN cascade network is a cascade network that combines the convolutional neural network CNN and the recurrent neural network RNN to model the spatial and temporal changes of facial expression under video sequence. In order to achieve a better recognition effect, a deep convolutional neural network structure is adopted, and the LSTM network will be selected as the temporal feature extractor to extract features using the correlation between continuous feature vectors. However, a network with a cascaded network method that is too deep might also cause problems such as gradient explosion or gradient disappearance.

On basis of conventional 2D spatial convolution, the three-dimensional convolutional neural network 3DCNN is added with a time dimension to form a three-dimensional convolution to obtain time series information. C3D network was first used for expression recognition on video sequences. C3D-based variant networks such as I3D combines facial feature points to extract geometric features of expressions. 3DCNN-DAP combines facial movement constraints with 3DCNN to improve expression recognition. Since the three-dimensional convolutional neural network adds a time dimension compared with the 2D network, consequently there are more training parameters and the amount of calculation is increased.

The optical flow method adopts the change of the expression sequence on the time dimension and the correlation between frames to find the relationship between frame changes, so as to calculate the change information of facial expression between adjacent frames. The optical flow method is combined with the convolutional neural network to form a two-way integrated network model, one way is for single-frame image feature extraction, and another is for training the optical flow graph of multi-frame data to extract time series information. Finally, the two-way space-time feature output results are fused. However, the optical flow method extracts the optical flow graph from the video sequence before training, and performs a lot of preprocessing work, which results in a long process and poor real-time performance.

In summary, although the existing facial expression recognition technology has achieved good recognition results, there are still many shortcomings. Most of the methods verify the expression dataset collected in an experimental environment. In natural conditions, the expression recognition rate is affected by factors such as head posture shifting, illumination changes, occlusion, and motion blur and therefore is considerably reduced. Accordingly, facial expression recognition under natural conditions remains to be a challenging problem to be solved.

SUMMARY

To solve the defects of related art, the purpose of the present disclosure is to provide a facial expression recognition method and system combined with an attention mechanism, aiming at solving the problem of existing facial expression recognition technologies which have low expression recognition rate because of being affected by head posture shifting, illumination changes, occlusion, and motion blur.

In order to achieve the above purpose, in a first aspect, the present disclosure provides a facial expression recognition method combined with an attention mechanism, and the method includes the following steps:

detecting a face included in each video frame in a video sequence, and extracting a corresponding facial region of interest (ROI), so as to obtain a facial picture in each video frame;

correcting the facial picture in each video frame on the basis of location information of facial feature point of the facial picture in each video frame, so that the facial picture in each video frame is aligned relative to the plane rectangular coordinate system;

inputting the aligned facial picture in each video frame of the video sequence into a residual neural network, and extracting a spatial feature of a facial expression corresponding to the facial picture;

inputting the spatial feature of the facial expression extracted from the video sequence into a hybrid attention module, the hybrid attention module calculates the feature weight of the facial expression through the attention mechanism, a weight higher than the threshold is assigned to an ROI of facial expression change and a weight lower than the threshold is assigned to a region irrelevant to the facial expression change to correlate the feature information of facial expression between video frames, a dependency relationship of facial expression between adjacent video frames is extracted, and irrelevant interference features are eliminated to acquire a fused feature of the facial expression;

inputting the fused feature of the facial expression acquired from the video sequence into a recurrent neural network, and extracting a temporal feature of the facial expression;

inputting the temporal feature of the facial expression extracted from the video sequence into a fully connected layer, and classifying and recognizing the facial expression in the video based on a facial expression template pre-stored in the fully connected layer.

In an optional embodiment, correcting the facial picture in each video frame on the basis of location information of facial feature point of the facial picture in each video frame, so that the facial picture in each video frame is aligned relative to the plane rectangular coordinate system is specifically as follows:

detecting multiple facial expression feature points in the facial picture in each video frame, the multiple facial expression feature points are respectively distributed in an eye area, an eyebrow area, a nose area, a mouth area and a facial contour area;

determining the position of the middle point of the face in the facial picture based on the feature point in the eye area and the feature point in the eyebrow area in the facial picture in each video, and aligning the facial picture based on the position of the middle point of the face; the aligning is alignment relative to the plane rectangular coordinate system, and two sides of the aligned facial picture are respectively parallel to two axes of the plane rectangular coordinate system.

In an optional embodiment, the step of aligning the facial picture based on the position of the middle point of the face is specifically as follows: using an affine transformation matrix to align the facial picture based on the position of the middle point of the face.

In an optional embodiment, before inputting the aligned facial picture in each video frame in the video sequence into the residual neural network, the following step is further included:

adjusting the size of the aligned facial picture uniformly to a picture of a preset size.

In an optional embodiment, the residual neural network, the hybrid attention module, the recurrent neural network and the fully connected layer all need to be pre-trained, and then perform facial expression recognition after training.

In the training phase, the facial picture inputted to the residual neural network needs to be subjected to facial picture alignment and adjusted to a picture with a uniform size, and a corresponding facial expression label needs to be marked on each facial picture; the facial expression label is the recognition result of the facial expression of each facial picture.

In an optional embodiment, the hybrid attention module is composed of a self-attention module and a spatial attention module.

The self-attention module calculates the self-attention weight of an expression of a single frame on the space dimension to the expression of a single through a fully connected layer and an activation function (sigmoid), assigns the weight to the spatial feature, and obtains a spatial attention feature vector.

The spatial attention module passes through an average pooling layer, 2D convolution layer (with kernel size 3×3 and padding size 1), and the sigmoid activation function on the spatial attention features of multiple frames, extracts an attention weight on the frame dimension, and performs feature fusion on the features of multiple frames, calculates the expression change features between adjacent frames, and obtains a fused feature vector fused with a space-time attention weight.

In the second aspect, the present disclosure provides a facial expression recognition system combined with an attention mechanism, which includes:

a facial picture detection unit, which is configured to detect a face included in each video frame in a video sequence, and extract a corresponding facial region of interest (ROI), so as to obtain a facial picture in each video frame;

a facial picture alignment unit, which is configured to align the facial picture in each video frame on the basis of location information of facial feature point of the facial picture in each video frame, so that the facial picture in each video frame is aligned relative to the plane rectangular coordinate system;

a spatial feature extraction unit, which is configured to input the aligned facial picture in each video frame of the video sequence into a residual neural network, and extract a spatial feature of a facial expression corresponding to the facial picture;

a fused feature extraction unit, which is configured to input the spatial feature of the facial expression extracted from the video sequence into a hybrid attention module, the hybrid attention module calculates the feature weight of the facial expression through the attention mechanism, a weight higher than the threshold is assigned to an ROI of facial expression change and a weight lower than the threshold is assigned to a region irrelevant to the facial expression change to correlate the feature information of facial expression between video frames, a dependency relationship of facial expression between adjacent video frames is extracted, and irrelevant interference features are eliminated to acquire a fused feature of the facial expression;

a temporal feature extraction unit, which is configured to input the fused feature of the facial expression acquired from the video sequence into a recurrent neural network, and extract a temporal feature of the facial expression; and a facial expression recognition unit, which is configured to input the temporal feature of the facial expression extracted from the video sequence into a fully connected layer, and classify and recognize the facial expression in the video based on a facial expression template pre-stored in the fully connected layer.

In an optional embodiment, the facial picture alignment unit detects multiple facial expression feature points in the facial picture in each video frame, and the multiple facial expression feature points are respectively distributed in the eye area, eyebrow area, nose area, mouth area, and facial contour area; determines the position of the middle point of the face in the facial picture based on the feature point in the eye area and the feature point in the eyebrow area in the facial picture in each video, and aligns the facial picture based on the position of the middle point of the face; the aligning is alignment relative to the plane rectangular coordinate system, and two sides of the aligned facial picture are respectively parallel to two axes of the plane rectangular coordinate system.

In an optional embodiment, the facial expression recognition system further includes:

a picture resizing unit, which is configured to, before inputting the aligned facial picture in each video frame in the video sequence into the residual neural network, adjust the size of the aligned facial picture uniformly to a picture of a preset size.

In an optional embodiment, the hybrid attention module used in the fused feature extraction unit is composed of a self-attention module and a spatial attention module. The self-attention module calculates the self-attention weight of an expression of a single frame on the space dimension through a fully connected layer and an activation function (sigmoid), assigns the weight to the spatial feature, and obtains a spatial attention feature vector. The spatial attention module passes through an average pooling layer, 2D convolution layer (with kernel size 3×3 and padding size 1), and the sigmoid activation function on the spatial attention features of multiple frames, extracts an attention weight on the frame dimension, and performs feature fusion on the features of multiple frames, calculates the expression change features between adjacent frames, and obtains a fused feature vector fused with a space-time attention weight.

Generally speaking, compared with related art, the above technical solution conceived by the present disclosure has the following advantageous effects:

The present disclosure provides a facial expression recognition method and system combined with an attention mechanism. By extracting the features of a video sequence on the space dimension and time dimension through a residual convolutional neural network and a recurrent neural network, and combining a hybrid attention mechanism to correlate information between frames, the dependency relationship between adjacent frames are extracted and irrelevant interference features are eliminated, so it is possible to obtain the attention features of facial expression. The present disclosure embeds the hybrid attention module into the convolutional neural network and the recurrent neural network model, thereby effectively improving the accuracy of facial expression recognition under illumination, occlusion, and head posture changes in a natural environment.

DESCRIPTION OF THE EMBODIMENTS

In order to make the purpose, technical solution and advantages of the present disclosure more clear, the present disclosure will be further described in detail below in conjunction with the accompanying drawings and embodiments. It should be understood that the specific embodiments described here are only used to explain the present disclosure, not to limit the present disclosure.

Figure 1:
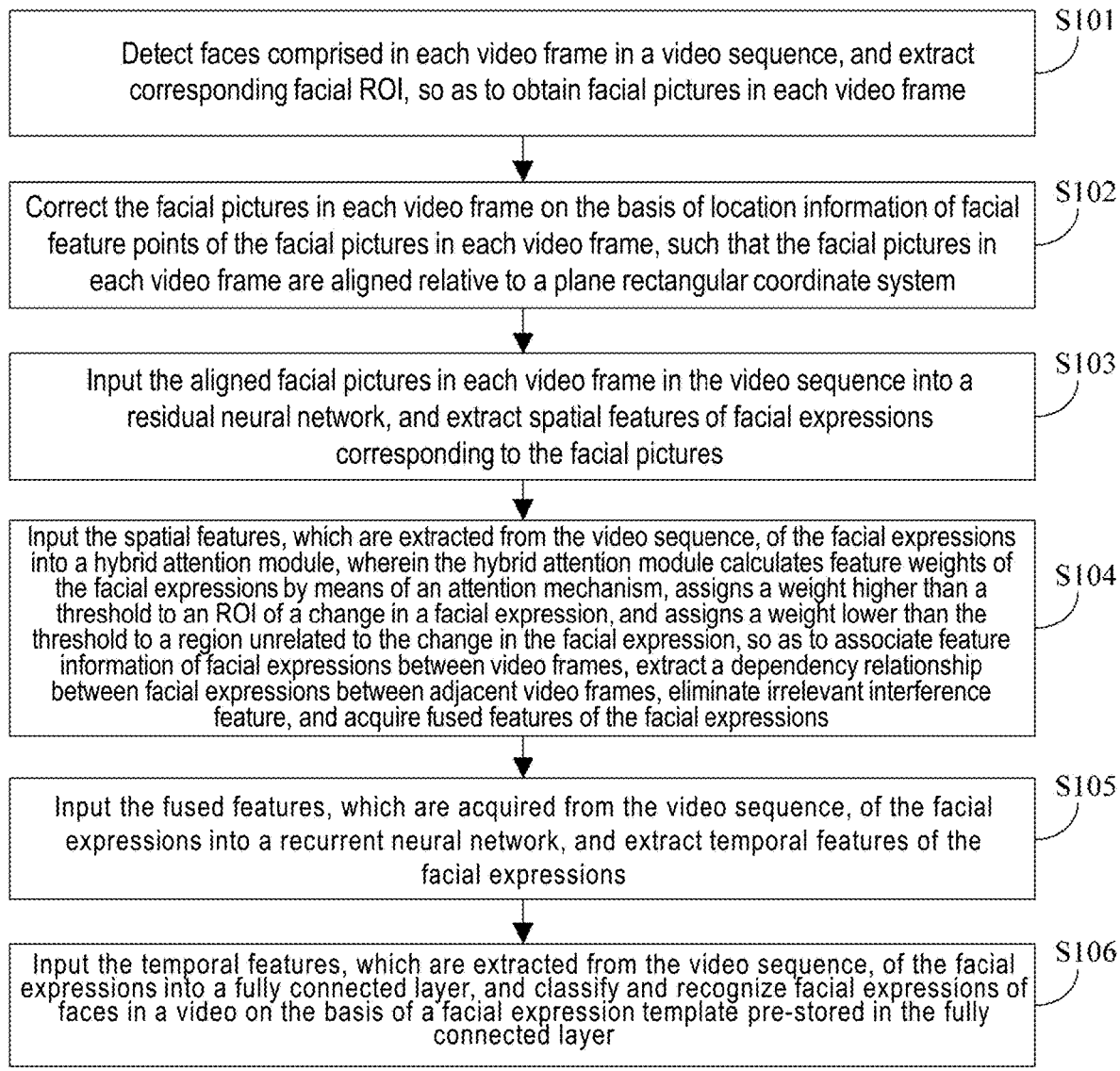
FIG. 1 is a flowchart of a facial expression recognition method combined with an attention mechanism provided by an embodiment of the present disclosure.

FIG. 1 is a flowchart of a facial expression recognition method combined with an attention mechanism provided by an embodiment of the present disclosure. As shown in FIG. 1, the method includes the following steps:

S101. detecting a face included in each of video frames in a video sequence, and extracting a corresponding facial region of interest (ROI), so as to obtain a facial picture in each video frame;

S102. correcting the facial picture in each video frame on the basis of location information of facial feature point of the facial picture in each video frame, so that the facial picture in each video frame is aligned relative to the plane rectangular coordinate system;

S103. inputting the aligned facial picture in each video frame of the video sequence into a residual neural network, and extracting a spatial feature of a facial expression corresponding to the facial picture;

S104. inputting the spatial feature of the facial expression extracted from the video sequence into a hybrid attention module, the hybrid attention module calculates the feature weight of the facial expression through the attention mechanism, a weight higher than the threshold is assigned to an ROI of facial expression change and a weight lower than the threshold is assigned to a region irrelevant to the facial expression change to correlate the feature information of facial expression between video frames, a dependency relationship of facial expression between adjacent video frames is extracted, and irrelevant interference features are eliminated to acquire a fused feature of the facial expression;

S105. inputting the fused feature of the facial expression acquired from the video sequence into a recurrent neural network, and extracting a temporal feature of the facial expression;

S106. inputting the temporal feature of the facial expression extracted from the video sequence into a fully connected layer, and classifying and recognizing the facial expression in the video based on a facial expression template pre-stored in the fully connected layer.

Figure 2:
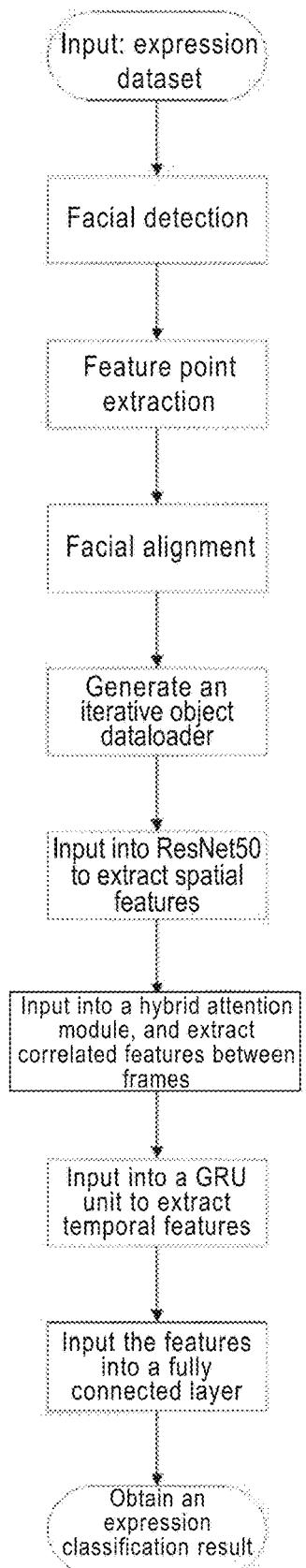
FIG. 2 is a technical flowchart of a facial expression recognition method combined with an attention mechanism provided by an embodiment of the present disclosure.

Specifically, a detailed technical solution of the facial expression recognition method based on the hybrid attention mechanism provided by the present disclosure is described as follows. FIG. 2 is a technical flowchart of a facial expression recognition method combined with an attention mechanism provided by an embodiment of the present disclosure. As shown in FIG. 2, the method includes the following steps.

S1 is obtaining face data in a dataset. The dataset may be a video sequence, and the harr feature extraction method is adopted to detect the face in each video frame in the video sequence through the grayscale change of the picture and the pixel region difference $D_{face}$, and extract a facial region of interest (ROI), thereby obtaining the facial picture data contained in each video frame in the video sequence.

$$D_{face} = \Sigma_{k \leq i_1, l \leq j_1} f(x,y) + \Sigma_{k \leq i_2, l \leq j_2} f(x,y) - (\Sigma_{k \leq i_3, l \leq j_3} f(x,y) + \Sigma_{k \leq i_4, l \leq j_4} f(x,y))$$

In the formula, (i, j) is the coordinate interval of the current divided region, (x, y) is the coordinate of a single pixel in the region, and f(x, y) sums the pixel coordinates in the current region.

S2 is extracting facial feature points. The facial feature point detection method in the dlib library is adopted to extract 68 feature points of the face from the facial picture data in S1, and the 68 feature points correspond to the eyes, eyebrows, nose, mouth and facial contour respectively, and the facial feature point sequence $P^{(t)}$ is obtained.

$$p^{(t)}=\{(x_1^{(t)},y_1^{(t)}), (x_2^{(t)}, y_2^{(t)}), (x_3^{(t)}, y_3^{(t)}), \ldots, (x_{68}^{(t)}, y_{68}^{(t)})\}$$

In the formula, $(x_i^{(t)}, y_i^{(t)})$ is a coordinate position of the i-th key point of the facial picture in the t-th video frame in the video sequence, $1 \leq i \leq 68$.

S3 is aligning faces. Based on the facial feature point sequence of the facial picture under each video frame obtained from S2, the faces in respective video frames are aligned, and the information of the middle point of the face is calculated according to the location information of the eye area and eyebrow area in the point information of extracted 68 feature points of the face. The affine transformation matrix is adopted to obtain the corrected facial picture in each video frame.

$$\begin{bmatrix} u \\ v \\ 1 \end{bmatrix} = \begin{bmatrix} a_1 & b_1 & c_1 \\ a_2 & b_2 & c_2 \\ 0 & 0 & 1 \end{bmatrix} \begin{bmatrix} x \\ y \\ 1 \end{bmatrix}$$

$$\begin{cases} u = a_1 x + b_1 y + c_1 \\ v = a_2 x + b_2 y + c_2 \end{cases}$$

In the formula, (x, y) is the coordinates of the middle point of the current face, (u, v) is the coordinates after transformation of facial picture, $c_1$ and $c_2$ represent the lateral shift amount, $a_1$, $a_2$, $b_1$, and $b_2$ represent variation parameters such as rotation and scaling of the current facial picture.

Figure 3:
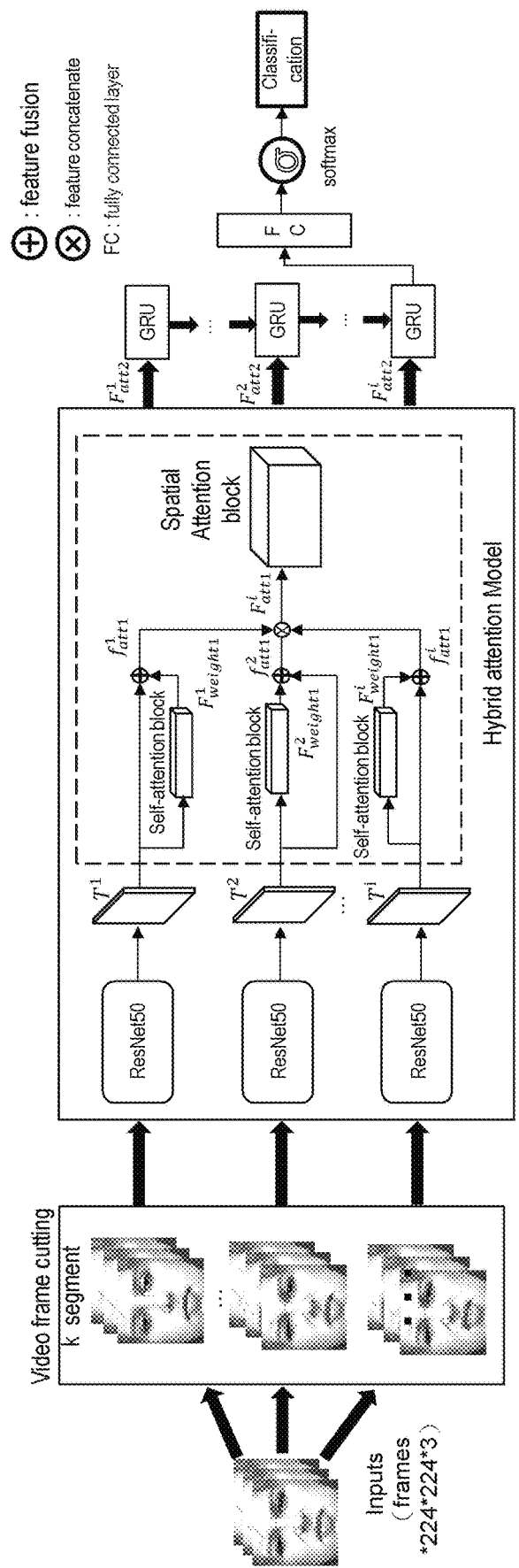
FIG. 3 is a structural diagram of an overall model of facial expression recognition combined with an attention mechanism provided by an embodiment of the present disclosure.

S4 is generating an input dataset. The aligned facial picture is adjusted to a picture in a size of 224*224; FIG. 3 is a structural diagram of an overall model of facial expression recognition combined with an attention mechanism provided by an embodiment of the present disclosure. As shown in FIG. 3, the overall model includes: video frame cutting, a residual convolutional neural network, a hybrid attention module, a recurrent neural network, and a fully connected layer. The details are as follows:

One-hot encoding is performed on the label L corresponding to each video expression to obtain the input $L_h$; a frame sequence is generated with n frames as a group. Since the number of each video frame is different, by referencing the TSN network processing flow, the video frame is divided into K parts, one frame is randomly selected from each part as the final input frame, and a sequence of K frames is obtained and concatenated with a corresponding label to form a dataset. The data is packaged into an iterative object dataloader as the input for network training.

$$L_h = \delta(L)$$

$$dataset=((w,h,c,frame),L_h)$$

$$dataloader=f(batchsize,dataset)$$

In the formula, $\delta$ is the one-hot encoding rule; w, h, and c respectively represent the height, width, and number of channels of the current frame, and frame represents the number of video frames; batchsize represents the number of samples selected for a single training; the function f represents operations such as randomly scrambling the dataset, setting the batchsize size, and setting the number of processes.

S5 is extracting spatial feature through the ResNet network. The dataset object dataloader is input into the residual convolutional neural network ResNet50 to extract the spatial feature of the facial expression in the video sequence, and obtain the extracted feature data T.

$$T=ResNet(dataloader)$$

The residual network ResNet50 is utilized as the spatial feature extraction network. The residual network may effectively solve the problems of gradient disappearance or gradient explosion as the number of network layers deepens. Through identity mapping of a residual block, the network transmits the current output to the next layer structure, and the shortcut connection will not generate additional parameters, so the computational complexity will not be increased. In the meantime, the Batch Normalization and Dropout layers used in the network may effectively prevent problems such as model overfitting and gradient disappearance.

S6 is inputting the extracted spatial feature into the hybrid attention module. The purpose of the hybrid attention module is to calculate the feature weight of the facial expression through the attention mechanism, assign a higher weight to the ROI of facial expression change and a lower weight to a region irrelevant with facial expression change, so that the network learns the features in the attention region, extracts the dependency relationship between frames, and eliminates irrelevant features from the video. The hybrid attention module consists of a self-attention module and a spatial attention module. The self-attention module calculates the self-attention weight of an expression of a single frame on the space dimension through a fully connected layer and an activation function(sigmoid), assigns the weight to the spatial feature, and obtains the spatial attention feature vector. The self-attention module only calculates weights in a single frame, and ignores the information correlation between frames, so the cascaded spatial attention module passes through an average pooling layer, 2D convolution layer (with kernel size 3×3 and padding size 1), and the sigmoid activation function on the spatial attention features of multiple frames, extracts the attention weight on the frame dimension, and performs feature fusion on features of multiple frames to obtain a feature vector that is fused with a space-time attention weight.

Figure 4:
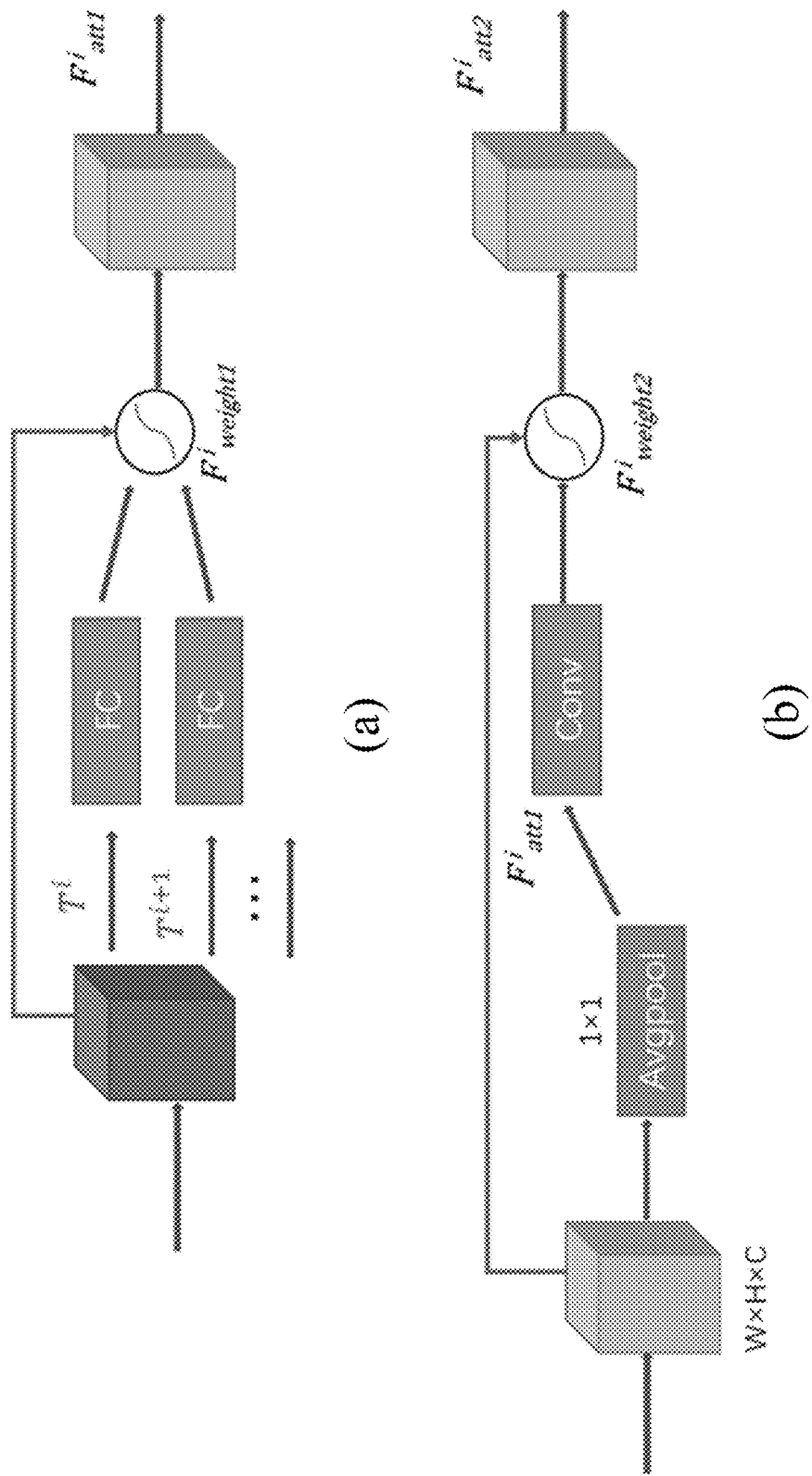
FIG. 4 is a diagram of the internal structure of a hybrid attention module provided by an embodiment of the present disclosure.

FIG. 4 is a diagram of the internal structure of a hybrid attention module provided by an embodiment of the present disclosure. As shown in FIG. 4, the spatial feature first enters the self-attention module, calculates the feature correlation of a single frame to obtain a self-attention weight $\theta$. The obtained self-attention weight weights the input feature, and outputs a new self-attention feature vector $F^i_{weight1}$. Then the first feature fusion is performed to input the fused feature $F^i_{att1}$ into the spatial attention module, the expression change features between adjacent frames are calculated to obtain the spatial attention weight $\theta^1$. Weighted calculation is performed to obtain the spatial attention feature vector $F^i_{weight2}$, and the second feature fusion is performed to obtain the final output feature $F^i_{att2}$ of the hybrid attention module.

$$F_{weight1}^i = \delta(T^i * \theta)$$

$$F_{weight2}^i = \delta(F_{att1}^i * \theta^1)$$

In the formula, $T^i$ represents the i-th frame feature vector extracted by the ResNet network, and $\delta$ represents the sigmoid function.

Specifically, the hybrid attention module is utilized to perform two feature fusions, in which the first feature fusion calculates the self-attention feature $F^i_{weight1}$ and the input feature $T^i$ to obtain $F^i_{att1}$.

$$F^i_{att1} = \frac{\sum_{i=1}^{n} F^i_{weight1} T^i}{\sum_{i=1}^{n} F^i_{weight1}}$$

In the formula, n represents the total number of frames of the current video. In the second feature fusion, the obtained spatial attention feature vector $F^i_{weight2}$ is calculated with $F^i_{att1}$ to obtain $F^i_{att2}$.

$$F^i_{att2} = \frac{\sum_{i=1}^{n} f^i_{weight2} F^i_{att1}}{\sum_{i=1}^{n} f^i_{weight2}}$$

S7 is inputting the fused facial feature into the recurrent neural network for temporal feature extraction. The present disclosure selects the gated recurrent unit (GRU) as the recurrent neural network to extract temporal features, and the gated recurrent unit is simpler than other recurrent neural network structural models, especially in models with deeper networks. GRU is able to forget and select memory simultaneously through a gate, and parameters are significantly reduced and the efficiency is higher. The temporal feature is obtained by GRU as a three-dimensional feature vector F.

$F = GRU(F_{att2}^i) = [\text{batchsize}, \text{frame}, \text{hidden}]$

In the formula, hidden is the size of hidden layer of the GRU unit, and the hidden layer unit is set to 128 in the model.

S8 is outputting the feature to the fully connected layer to obtain a prediction result. The feature vector obtained by the GRU unit is adjusted in dimension and then input into a fully connected layer to obtain a final expression classification result.

After performing the above steps, facial expression recognition under video sequence is realized. During the training process, the cross-entropy loss function is utilized to optimize the loss function value through the stochastic gradient descent algorithm, sigmoid is utilized as the activation function, the weight decay is set to 0.0001, and the momentum is set to 0.9. The learning rate is dynamically adjusted during the process, and finally the optimum result is obtained.

The experiment adopted accuracy rate, confusion matrix, receiver operating characteristic curve (ROC) area as the evaluation index of expression recognition. Specifically, the larger the accuracy value and the ROC area of the receiver operating characteristic curve, the better the recognition effect; the confusion matrix shows the prediction accuracy of each specific expression.

Specifically, the comparison of accuracy rate of facial expression recognition performed on the CK+ dataset between the method of the present disclosure and other methods is shown in Table 1:

TABLE 1

Comparison of methods in the case of CK+ dataset

| Method | Average accuracy |
|---|---|
| BDBN | 96.7% |
| LOMo | 92.0% |

TABLE 1-continued

Comparison of methods in the case of CK+ dataset

| Method | Average accuracy |
|---|---|
| 3DIR + landmarks | 93.21% |
| DTAGN | 97.25% |
| Inception-w | 97.5% |
| Present disclosure | 98.46% |

Specifically, the comparison of accuracy rate of facial expression recognition performed on the Oulu-CASIA dataset between the method of the present disclosure and other methods is shown in Table 2:

TABLE 2

Comparison of methods in the case of Oulu-CASIA dataset

| Method | Average accuracy |
|---|---|
| LOMo | 74.0% |
| PPDN | 84.59% |
| DTAGN | 81.46% |
| Inception-w | 85.24% |
| FaceNet2ExpNet | 87.7% |
| Present disclosure | 87.31% |

Specifically, the comparison of accuracy rate of facial expression recognition performed on the AFEW dataset between the method of the present disclosure and other methods is shown in Table 3:

TABLE 3

Comparison of methods in the case of AFEW dataset

| Method | Average accuracy |
|---|---|
| Mode variational LSTM | 48.83% |
| spatio-temporal RBM | 46.36% |
| DenseNet-161 | 51.4% |
| Present disclosure | 53.44% |

It can be seen from Tables 1, 2, and 3 that the facial expression recognition method combined with hybrid attention mechanism constructed by the present disclosure has excellent performance in accuracy of the three datasets. The accuracy rates of the method of the present disclosure in performing facial recognition on the CK+ dataset and the AFEW dataset are better than the current mainstream methods.

Figure 5:
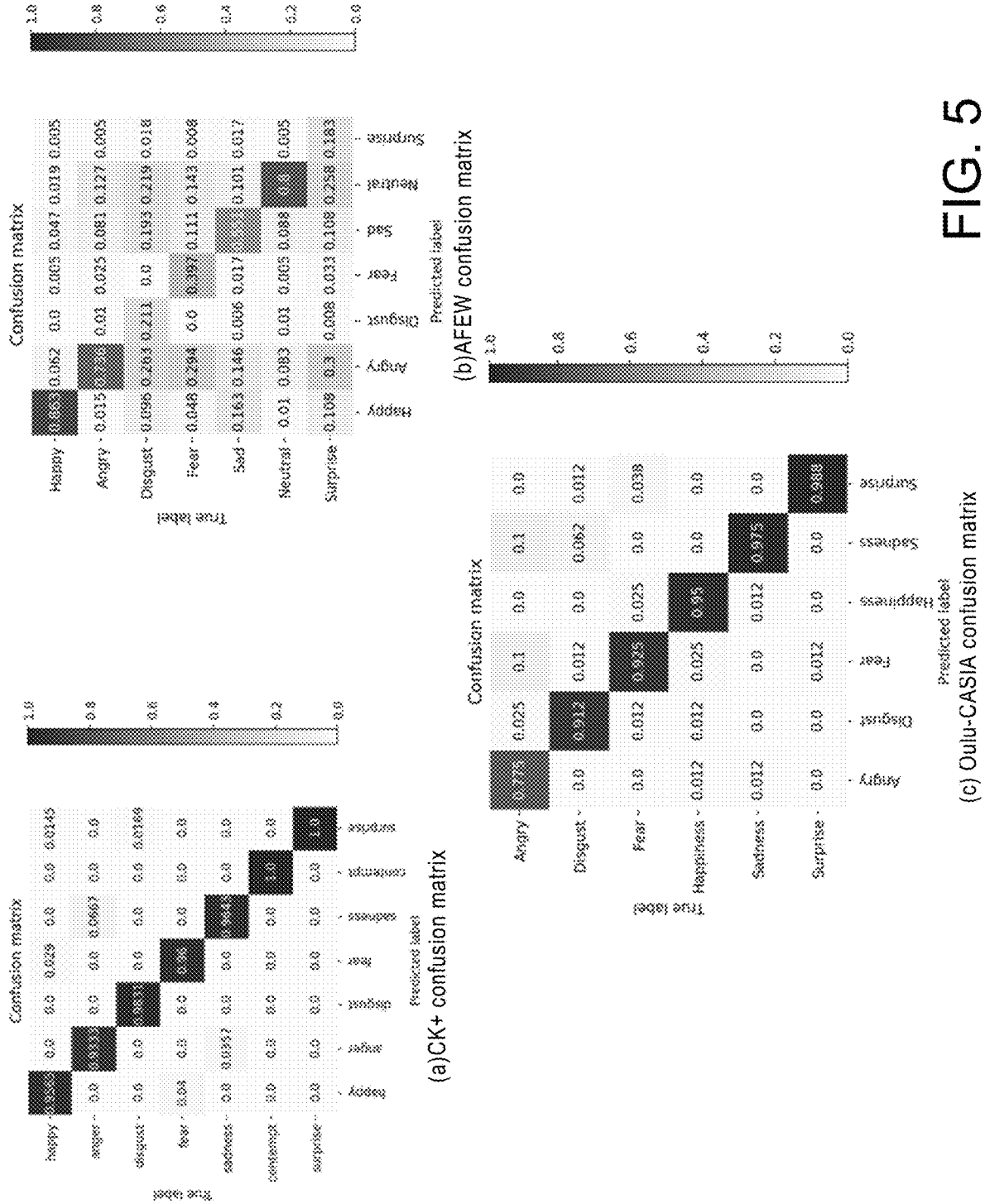
FIG. 5 is an expression classification confusion matrix result diagram of the method of the present disclosure on three datasets provided by an embodiment of the present disclosure.

FIG. 5 is a diagram of a confusion matrix identified by the method of the present disclosure on three datasets. The confusion matrix is a standard format used for accuracy evaluation, and is used to compare the prediction result and the actual classification value. It can be seen from FIG. 5 that the method of the present disclosure has good classification results on both CK+ and Oulu-CASIA datasets. Since the AFEW dataset is taken from a natural environment, its performance on the confusion matrix is different from that of a dataset in an experimental environment, but is still better.

Table 4 is the comparison of the ROC areas of the present disclosure on various datasets, and ROC is a performance index to measure the pros and cons of deep learning methods. The ROC area is in the range of 0.5 to 1, and the classifier with a larger value has a better classification effect. It can be seen from Table 4 that the ROC areas of the method of the present disclosure on the three datasets are all much greater than 0.5, indicating that the method of the present disclosure has a better effect on facial expression recognition and classification.

TABLE 4

Comparison of ROC areas in case of different datasets

| Datasets | ROC area |
|---|---|
| CK+ | 0.98 |
| AFEW | 0.76 |
| Oulu-CASIA | 0.90 |

Figure 6:
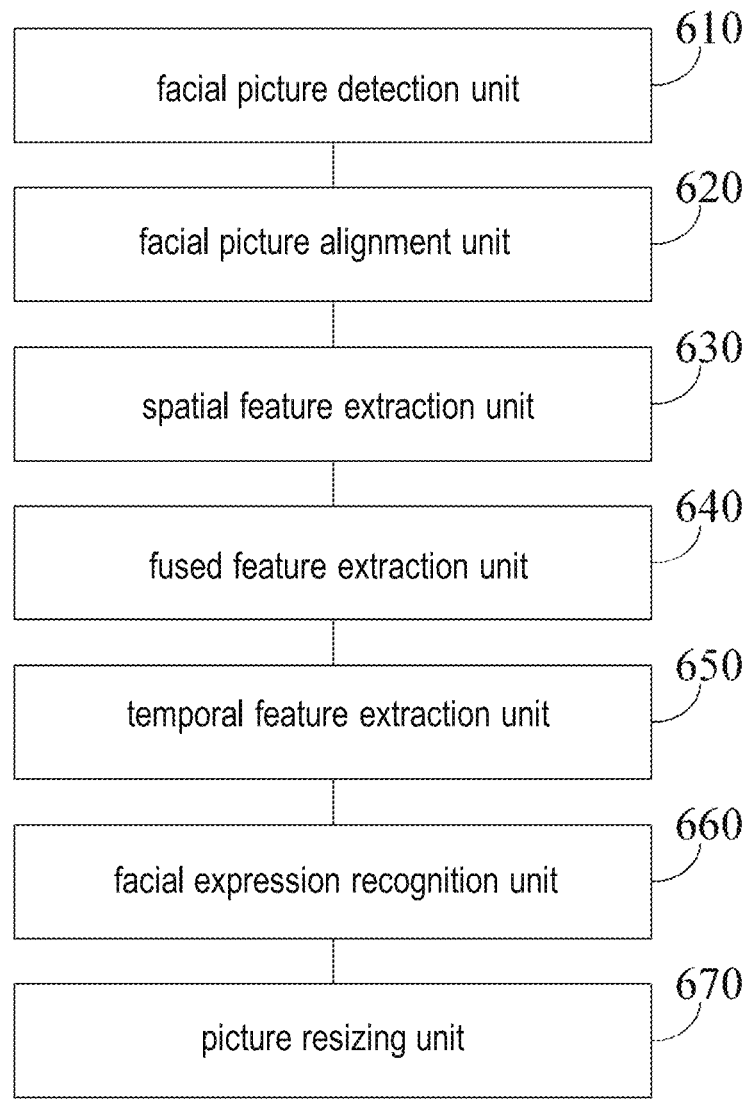
FIG. 6 is a framework diagram of a facial expression recognition system combined with an attention mechanism provided by an embodiment of the present disclosure.

FIG. 6 is a framework diagram of a facial expression recognition system combined with an attention mechanism provided by an embodiment of the present disclosure. As shown in FIG. 6, the system includes:

a facial picture detection unit 610, which is configured to detect a face included in each video frame in a video sequence, and extract a corresponding facial region of interest (ROI), so as to obtain a facial picture in each video frame;

a facial picture alignment unit 620, which is configured to correct the facial picture in each video frame on the basis of location information of facial feature point of the facial picture in each video frame, so that the facial picture in each video frame is aligned relative to the plane rectangular coordinate system;

a spatial feature extraction unit 630, which is configured to input the aligned facial picture in each video frame of the video sequence into a residual neural network, and extract a spatial feature of a facial expression corresponding to the facial picture;

a fused feature extraction unit 640, which is configured to input the spatial feature of the facial expression extracted from the video sequence into a hybrid attention module, the hybrid attention module calculates the feature weight of the facial expression through the attention mechanism, a weight higher than the threshold is assigned to an ROI of facial expression change and a weight lower than the threshold is assigned to a region irrelevant to the facial expression change to correlate the feature information of facial expression between video frames, a dependency relationship of facial expression between adjacent video frames is extracted, and irrelevant interference features are eliminated to acquire a fused feature of the facial expression;

a temporal feature extraction unit 650, which is configured to input the fused feature of the facial expression acquired from the video sequence into a recurrent neural network, and extract a temporal feature of the facial expression; and a facial expression recognition unit 660, which is configured to input the temporal feature of the facial expression extracted from the video sequence into a fully connected layer, and classify and recognize the facial expression in the video based on a facial expression template pre-stored in the fully connected layer.

A picture resizing unit 670 is configured to, before inputting the aligned facial picture in each video frame in the video sequence into the residual neural network, adjust the size of the aligned facial picture uniformly to a picture of a preset size.

Specifically, for the detailed functions of various units in FIG. 6, please refer to the description in the foregoing method embodiments, and details are not repeated here.

It is easy for those skilled in the art to understand that the above descriptions are only preferred embodiments of the present disclosure, and are not intended to limit the present disclosure. Any modifications, equivalent replacements and improvements made within the spirit and principles of the present disclosure should all be included within the scope to be protected by the present disclosure.

What is claimed is:

1. A facial expression recognition method combined with an attention mechanism, comprising following steps:

detecting a face comprised in each of video frames in a video sequence, and extracting a corresponding facial region of interest (ROI), so as to obtain a facial picture in each of the video frames;

correcting the facial picture in each of the video frames on the basis of location information of a facial feature point of the facial picture in each of the video frames, so that the facial picture in each of the video frames is aligned relative to a plane rectangular coordinate system;

inputting the aligned facial picture in each of the video frames of the video sequence into a residual neural network, and extracting a spatial feature of a facial expression corresponding to the facial picture;

calculating a feature weight of the facial expression through an attention mechanism using the spatial feature of the facial expression extracted from the video sequence, a weight higher than a threshold is assigned to an ROI of a facial expression change and a weight lower than the threshold is assigned to a region irrelevant to the facial expression change to correlate feature information of the facial expression between the video frames, a dependency relationship of the facial expression between the adjacent video frames is extracted, and irrelevant interference features are eliminated to acquire a fused feature of the facial expression;

inputting the fused feature of the facial expression acquired from the video sequence into a recurrent neural network, and extracting a temporal feature of the facial expression;

inputting the temporal feature of the facial expression extracted from the video sequence into a fully connected layer, and classifying and recognizing the facial expression in a video based on a facial expression template pre-stored in the fully connected layer.

2. The facial expression recognition method combined with the attention mechanism according to claim 1, wherein correcting the facial picture in each of the video frames on the basis of location information of the facial feature point of the facial picture in each of the video frames, so that the facial picture in each of the video frames is aligned relative to the plane rectangular coordinate system comprises:

detecting a plurality of facial expression feature points in the facial picture in each of the video frames, the plurality of facial expression feature points are respectively distributed in an eye area, an eyebrow area, a nose area, a mouth area and a facial contour area;

determining a position of a middle point of a face in the facial picture based on a feature point in the eye area and a feature point in the eyebrow area in the facial picture in each of the videos, and aligning the facial picture based on the position of the middle point of the face; the aligning is alignment relative to the plane rectangular coordinate system, and two sides of the aligned facial picture are respectively parallel to two axes of the plane rectangular coordinate system.

3. The facial expression recognition method combined with the attention mechanism according to claim 2, wherein aligning the facial picture based on the position of the middle point of the face comprises: using an affine transformation matrix to align the facial picture based on the position of the middle point of the face.

4. The facial expression recognition method combined with the attention mechanism according to claim 2, wherein before inputting the aligned facial picture in each of the video frames in the video sequence into the residual neural network, further comprising the following steps:
adjusting a size of the aligned facial picture uniformly to a picture of a preset size.

5. The facial expression recognition method combined with the attention mechanism according to claim 4, wherein the residual neural network, the recurrent neural network and the fully connected layer all need to be pre-trained, and then perform the facial expression recognition after the training;
in a training phase, the facial picture inputted to the residual neural network needs to be subjected to the facial picture alignment and adjusted to the picture with the uniform size, and a corresponding facial expression label needs to be marked on each of the facial pictures; the facial expression label is a recognition result of the facial expression of each of the facial pictures.

6. The facial expression recognition method combined with the attention mechanism according to claim 1, further comprising:
calculating a self-attention weight of an expression of a single frame on a space dimension through a fully connected layer and an activation function(sigmoid), assigning the weight to the spatial feature, and obtaining a spatial attention feature vector;
passing through an average pooling layer, 2D convolution layer(with kernel size 3×3 and padding size 1), and the sigmoid activation function on spatial attention features of a plurality of frames, extracting an attention weight on a frame dimension, and performing feature fusion on the features of the frames, calculating expression change features between the adjacent frames, and obtaining a fused feature vector fused with a space-time attention weight.

* * * * *